US012680757B2

(12) United States Patent
Gerry, Jr. et al.

(10) Patent No.: US 12,680,757 B2
(45) Date of Patent: Jul. 14, 2026

(54) COMPACT HIGH PERFORMANCE THROUGH-AIR APPARATUS

(71) Applicant: Valmet AB, Sundsvall (SE)

(72) Inventors: Stanley M. Gerry, Jr., Gray, ME (US); Jan Skawski, Wilton, ME (US); Douglas B. Staples, Portland, ME (US)

(73) Assignee: Valmet AB, Sundsvall (SE)

( * ) Notice: Subject to any disclaimer, the term of this patent is extended or adjusted under 35 U.S.C. 154(b) by 1091 days.

(21) Appl. No.: 17/749,745

(22) Filed: May 20, 2022

(65) Prior Publication Data

US 2023/0024324 A1 Jan. 26, 2023

Related U.S. Application Data

(60) Provisional application No. 63/224,558, filed on Jul. 22, 2021.

(51) Int. Cl.

*F26B 13/16* (2006.01)
*D21F 5/18* (2006.01)
*F26B 13/10* (2006.01)

(52) U.S. Cl.

CPC .............. *F26B 13/16* (2013.01); *D21F 5/184* (2013.01); *F26B 13/101* (2013.01)

(58) Field of Classification Search

CPC ...... F26B 13/16; F26B 13/101; F26B 21/004; F26B 21/028; F26B 21/12; D21F 5/184

See application file for complete search history.

(56) References Cited

U.S. PATENT DOCUMENTS

| | | | |
|---|---|---|---|
| 2,065,032 | A | 12/1936 | Spooner |
| 3,065,551 | A | 11/1962 | Cohn et al. |
| 3,476,367 | A | 11/1969 | Fleissner |
| 4,481,722 | A | 11/1984 | Guy et al. |
| 4,677,761 | A | 7/1987 | Rattner |

(Continued)

FOREIGN PATENT DOCUMENTS

| | | | |
|---|---|---|---|
| DE | 2113472 | A1 | 9/1972 |
| WO | 2017/081628 | A1 | 5/2023 |

OTHER PUBLICATIONS

Notification of Transmittal of the International Preliminary Report on Patentability, International Application No. PCT/EP2022/069911; mailed Oct. 6, 2023.

(Continued)

*Primary Examiner* — Jessica Yuen
(74) *Attorney, Agent, or Firm* — Pierce Atwood LLP

(57) ABSTRACT

A high performance through-air apparatus is provided. The though-air apparatus includes a through-air roll configured for rotational movement about a first axis, and a high flow circuitous air path inside of the apparatus that includes a path extending through a supply conduit, through the through-air roll, and also through an exhaust conduit. The through-air apparatus also includes a plurality of turning vanes positioned within the high flow circuitous path positioned to guide the flow of air through the apparatus. The through-air apparatus has a length, a width, a height, which together define a volume having a compact configuration. The high flow circuitous air path inside of the apparatus has a length, where the ratio of the volume of the through-air apparatus to the length of the high flow circuitous air path is less than 20 $m^2$.

28 Claims, 9 Drawing Sheets

(56) References Cited

U.S. PATENT DOCUMENTS

| | | | | |
|---|---|---|---|---|
| 5,570,594 | A | 11/1996 | Fleissner | |
| 5,575,080 | A | 11/1996 | Fleissner | |
| 5,937,538 | A | 8/1999 | Joiner | |
| 7,040,038 | B1 | 5/2006 | Beaumont | |
| 10,539,369 | B2 | 1/2020 | Boehn | |
| 10,612,847 | B2 | 4/2020 | Ayrault et al. | |
| 2006/0085998 | A1 * | 4/2006 | Herman | F26B 13/24 34/95 |
| 2014/0223765 | A1 | 8/2014 | Bohn | |
| 2019/0368812 | A1 | 12/2019 | Violette et al. | |

OTHER PUBLICATIONS

International Search Report and Written Opinon of the International Searching Authority for International Application No. PCT/EP2022/069911 mailed Feb. 13, 2023, 18 pages.

* cited by examiner

| Parameter | Embodiment | Conventional Bonder A | Conventional Bonder B | Conventional Bonder C |
|---|---|---|---|---|
| Air Path Length Total (m) | 29.5 | 42.5 | 79.6 | 51.9 |
| | | | | |
| Length - Cross-Machine Direction (m) | 10.0 | 13.7 | 34.1 | 12.1 |
| Width - Machine Direction (m) | 4.4 | 8.3 | 13.1 | 20.1 |
| Machine Height (m) | 6.9 | 13.8 | 5.8 | 6.4 |
| | | | | |
| Machine Footprint (Width x Length) (m^2) | 44.0 | 113.7 | 446.7 | 243.2 |
| Footprint Perimeter (m) | 28.8 | 44.0 | 94.4 | 64.4 |
| Machine Volume (Width x Length x Height) (m^3) | 303.6 | 1569.2 | 2590.9 | 1556.5 |
| | | | | |
| **Volume Divided by Path Length (m^2)** | **10.3** | **36.9** | **32.5** | **30.0** |

FIG. 11

COMPACT HIGH PERFORMANCE THROUGH-AIR APPARATUS

FIELD OF THE INVENTION

The invention relates, in part, to a compact high performance through-air apparatus for manufacturing web products.

BACKGROUND

A through-air apparatus generally includes a rigid air-permeable web-carrying structure, known as a through-air roll. A web is placed on the through-air roll, and as the web-carrying structure rotates, a fan may blow air through the wall of the through-air roll to treat the web. The through-air roll typically has a plurality of openings to permit the air to pass through the roll.

Systems and methods related to through-air drying are commonly referred to through the use of the "TAD" acronym. Systems and methods related to through-air bonding are commonly referred to through the use of the "TAB" acronym.

SUMMARY

In one embodiment, a high performance through-air apparatus is provided. The though-air apparatus includes a through-air roll configured for rotational movement about a first axis, and a high flow circuitous air path inside of the apparatus that includes a path extending through a supply conduit, through the through-air roll, and also through an exhaust conduit. The through-air apparatus also includes a plurality of turning vanes positioned within the high flow circuitous path positioned to guide the flow of air through the apparatus. The through-air apparatus has a length, a width, a height, which together define a volume having a compact configuration. The high flow circuitous air path inside of the apparatus has a length, where the ratio of the volume of the through-air apparatus to the length of the high flow circuitous air path is less than 20 $m^2$.

BRIEF DESCRIPTION OF THE DRAWINGS

FIG. 11 is a chart which illustrates various dimensions and data for one embodiment compared to three conventional bonder systems;

DETAILED DESCRIPTION

The present disclosure is directed to a through-air apparatus configured to manufacture various products, such as paper, tissue, and/or nonwoven webs. One of ordinary skill in the art would recognize that the through-air apparatus may be configured as a through-air dryer (TAD) and/or a through-air bonder (TAB), depending on the context in which the apparatus is used. One of ordinary skill in the art will also recognize that the through-air apparatus may be used to make various web products that are rolled in their finished end product form. It should also be recognized that the product may not be rolled and/or may be cut into a finished end product. Furthermore, one of ordinary skill in the art will also recognize that the through-air apparatus may be configured to make various products, including, but not limited to various films, fabric, or other web type material, and the apparatus may be used for various processes that may include mass transfer, heat transfer, material displacement, web handling, and quality monitoring, including, but not limited to drying, thermal bonding, sheet transfer, water extraction, web tensioning, and porosity measurement.

As set forth in more detail below, the through-air apparatus includes a rigid air-permeable web-carrying structure, known as a through-air roll, configured to rotate relative to another portion of the apparatus. A web is placed on the through-air roll, and as the web moves, a fan may blow air through the wall of the through-air roll to treat the web. The through-air roll typically has a plurality of openings to permit the air to pass through the structure.

As an overview, a web (i.e. product) is typically in a sheet-form and it is partially wrapped around the through-air roll of the through-air apparatus. The web is wrapped about a portion of the roll ranging from, for example, 90° to 360°, and typically between 180°-300° around the roll. A fan/blower is used to circulate the air across the product, and the through-air roll is typically positioned within a hood to optimize the air flow characteristics. As the product travels with the rotating through-air roll, through the active zone of the apparatus, the fan/blower circulates air through the wall of the through-air roll to treat the product. A heater may be provided so that heated air circulates through the through-air roll.

Figure 1:
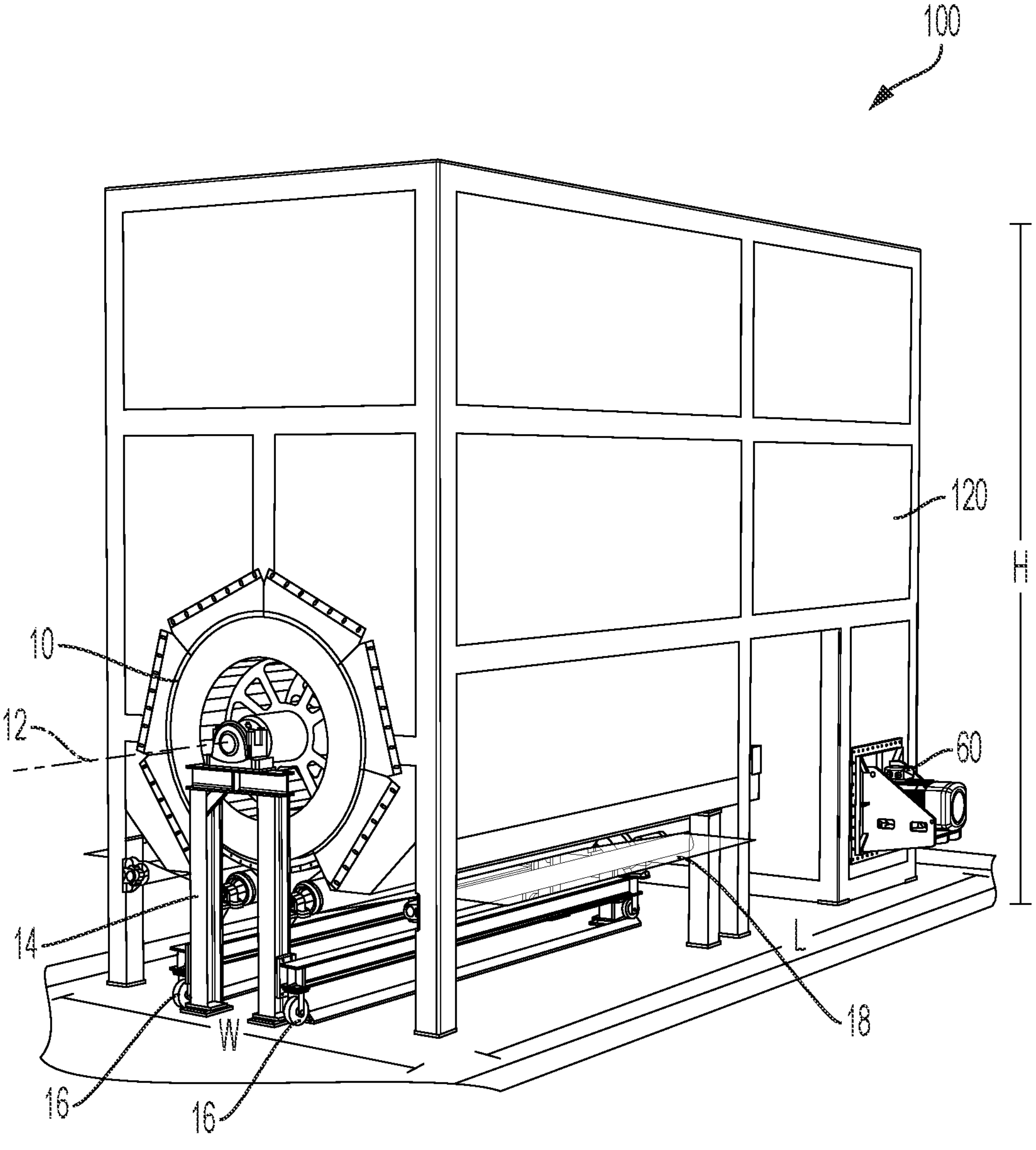
FIG. 1 is a perspective view of a through-air apparatus according to one embodiment.

One embodiment of the through-air apparatus 100 is illustrated in FIG. 1. As shown, the through-air apparatus 100 includes a though-air roll 10 that is configured to carry a web 18 and rotate about a first axis 12. As set forth in more detail below, aspects of the present disclosure are directed to a through-air apparatus 100 having a high flow circuitous flow path inside of the apparatus. The system includes a fan 60 that directs system air (also known as process air) along the flow path and into the through-air roll 10. As set forth in more detail below, this circuitous flow path enables the overall volume of the apparatus to be smaller than a conventional through-air apparatus.

A through-air apparatus 100 is often a very large machine. For example, the through-air roll 10 may have a length between 1 foot-30 feet, and a diameter between 1 foot-22 feet.

The inventors recognized that a conventional through-air apparatus generally falls into two categories: (1) a compact through-air apparatus which may have difficulty meeting product quality needs and with lower production throughput; or (2) a high performance, high throughput through-air apparatus that requires a large machine air system which may be difficult to fit in some machine spaces. In addition, the cost of these large and cumbersome high performance through-air apparatus systems may be high. Furthermore, the large high performance machines also typically have a long lead time from sale to delivery, including large shipment sizes from the point of manufacture, and having a large amount of void volume during shipping due to the way a conventional duct is constructed. Machine installation may be complex requiring significant calendar time, skills and building space.

Recognizing some of the problems associated with the conventional designs, aspects of the present disclosure are directed to a compact through-air apparatus which includes some of the features of a large high-performance through-air apparatus with the benefits of lower capital costs to the consumer, shorter lead times, and a smaller overall size which means that less building space is required.

End user product properties drive the need for tight air flow and temperature uniformity for a through-air apparatus. For example, current technology requires the machine builder of a through-air bonder to provide a large external air system to meet the high performance requirements of a +/−1.5° C. for air temperature and 15% peak to peak for air pressure supplied to the product to be bonded. As set forth in more detail below, in one embodiment, the through-air apparatus 100 uses a unique combination of different technologies to meet these high performance requirements while maintaining a small machine footprint and/or a small machine volume.

Also, as set forth in more detail below, aspects of the present disclosure are directed to a through-air apparatus which utilizes a panelized construction. For example, as shown in FIG. 1, in one embodiment, the through-air apparatus 100 is made of a plurality of panels 120 which are assembled together to form the through-air apparatus 100. The inventors recognized that this modular panelized design may allow for ease of manufacturing, provide compact shipping, and/or may also improve accessibility and maintenance. Further details regarding these panels 120 are disclosed in FIG. 7 and described in more detail below.

Figure 2:
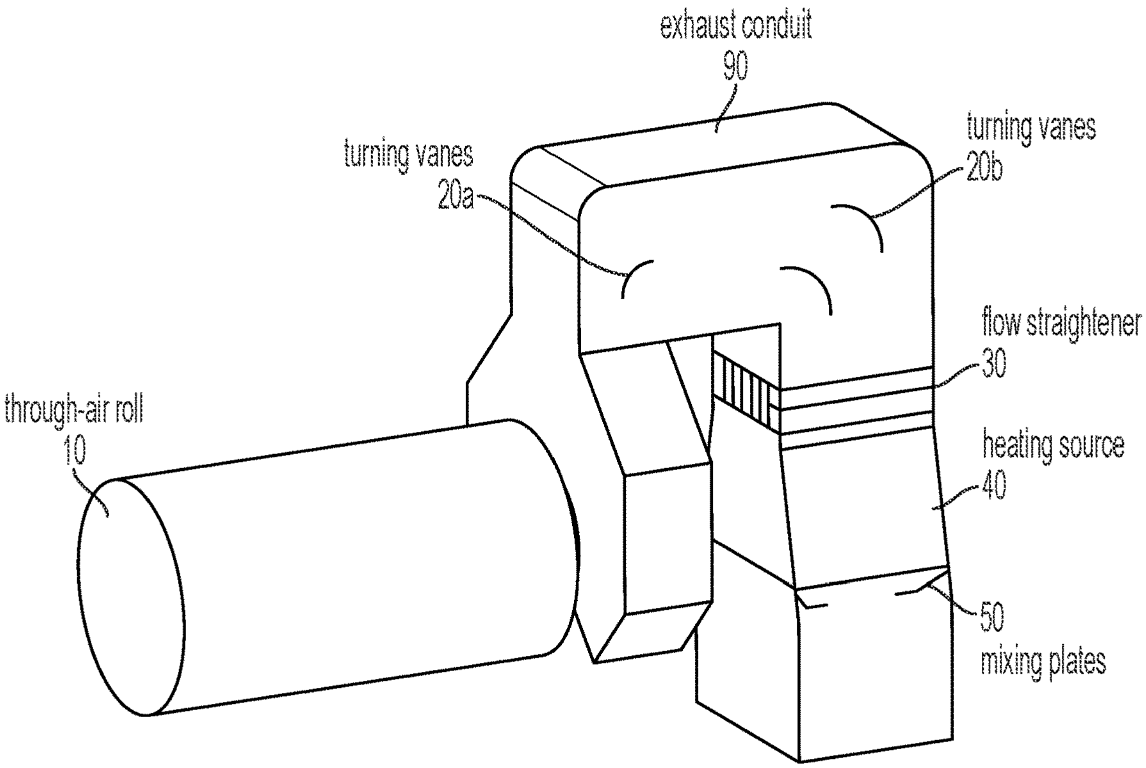
FIG. 2 is a perspective view of a portion of the through-air apparatus which includes a through-air roll and an exhaust conduit according to one embodiment.
Figure 3:
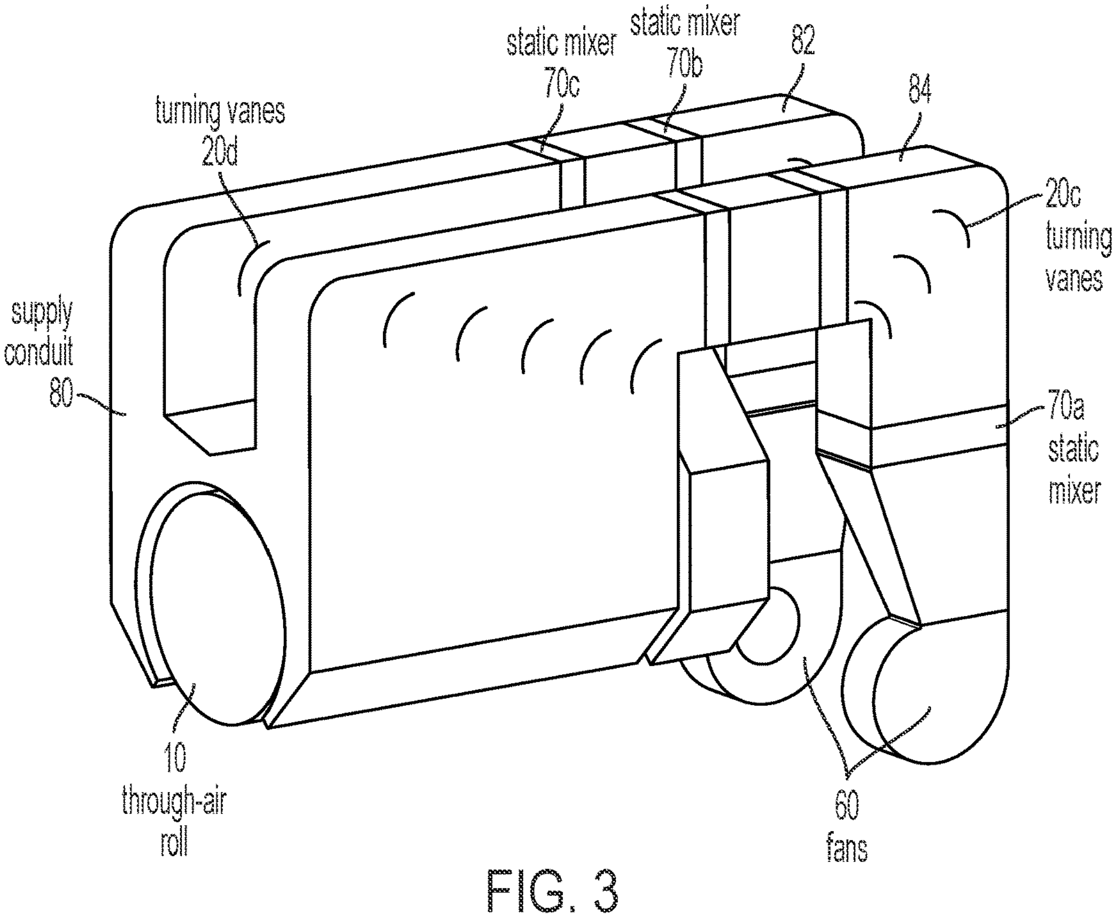
FIG. 3 is a perspective view of a portion of a through-air apparatus which includes a supply conduit according to one embodiment.

Turning now to FIGS. 2 and 3, the inside of the apparatus 100 will now be described. FIGS. 2 and 3 illustrate different portions of the through-air apparatus 100 according to one embodiment. The through-air apparatus 100 includes a through-air roll 10, a supply conduit 80, and an exhaust conduit 90. FIG. 2 illustrates a through-air roll 10 and an exhaust conduit 90 (with the supply conduit 80 omitted), and FIG. 3 illustrates a through-air roll 10 and a supply conduit 80 (with the exhaust conduit 90 omitted). As an overview, air travels through the supply conduit 80, through the through-air roll 10, and then through the exhaust conduit 90. In one embodiment, this is a recirculating air path. In one embodiment, there is a make-up air damper so that some new air enters the air path and a dump to atmosphere so air exits the air path. This defines a high flow circuitous air path which extends through the supply conduit 80, the through-air roll 10, and the exhaust conduit 90. As described in more detail below, this circuitous flow path enables the overall volume of the apparatus to be smaller than a conventional through-air apparatus. The inventors recognized that having a winding and/or meandering air flow path enables one to achieve a particular desired overall air flow path length within a smaller volume. Further details regarding embodiments having an extraction conduit configured to dump to atmosphere is described below and shown in FIGS. 12 and 13.

As shown, in one embodiment, the supply conduit 80 is bifurcated into a first supply conduit 82 positioned on a right side of the apparatus 100 and a second supply conduit 84 positioned on a left side of the apparatus 100, and the exhaust conduit 90 is configured to be interposed between the first supply conduit 82 and the second supply conduit 84. The inventors recognized that sharing common walls between the supply conduit 80 and the exhaust conduit 90 is one way to achieve a more compact design. In other words, a first side of a common wall may act as a portion of the supply conduit 80, whereas a second opposite side of the common wall may act as a portion of the exhaust conduit 90. Further details within both the supply conduit 80 and the exhaust conduit are described below.

The inventors recognized that this design enables the through-air apparatus 100 to have high performance air flow characteristics in a compact space. As shown in FIG. 1, the through-air apparatus 100 has a length L, a width W, and a height H, which together define a volume. As described further below, in one embodiment, the high flow circuitous air path inside of the apparatus has a length, and the ratio of the volume of the through-air apparatus 100 to the length of the high flow circuitous air path is less than 20 $m^2$. As discussed in more detail below, the air path length is calculated as the entire distance a molecule of air travels as it circulates through the through-air apparatus along the centerline of the conduits (i.e. ducting network defined by the through-air roll 10, the exhaust conduit 90 and the supply conduit 80) and completes one full circuit, thus returning to its point of origin. As shown in FIG. 1, in one embodiment, the Length L of the apparatus 100 is defined as the dimension substantially parallel with the first axis 12 (i.e. axis of rotation of the through-air roll 10). In other words, the first axis 12 is substantially parallel to the length L of the through-air apparatus 100.

Figure 4:
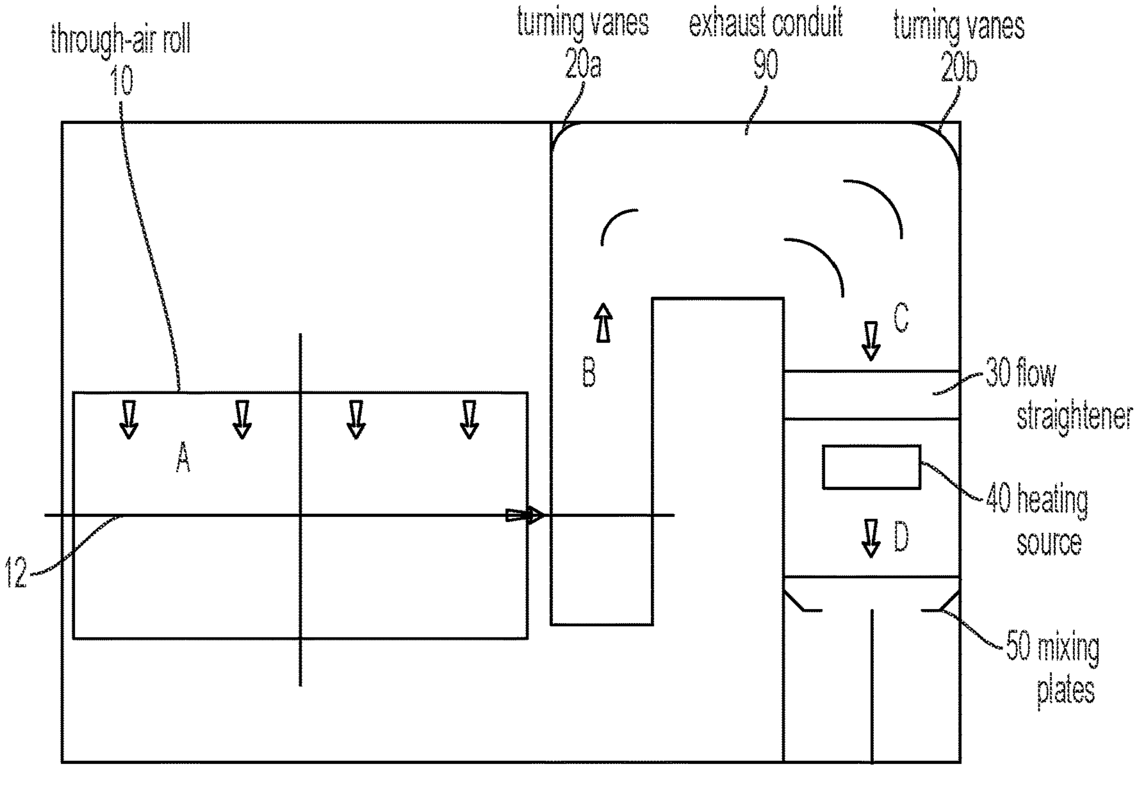
FIG. 4 is a sectional view cut through the center of the through-air apparatus which illustrates the circuitous air path through the exhaust conduit according to one embodiment.
Figure 5:
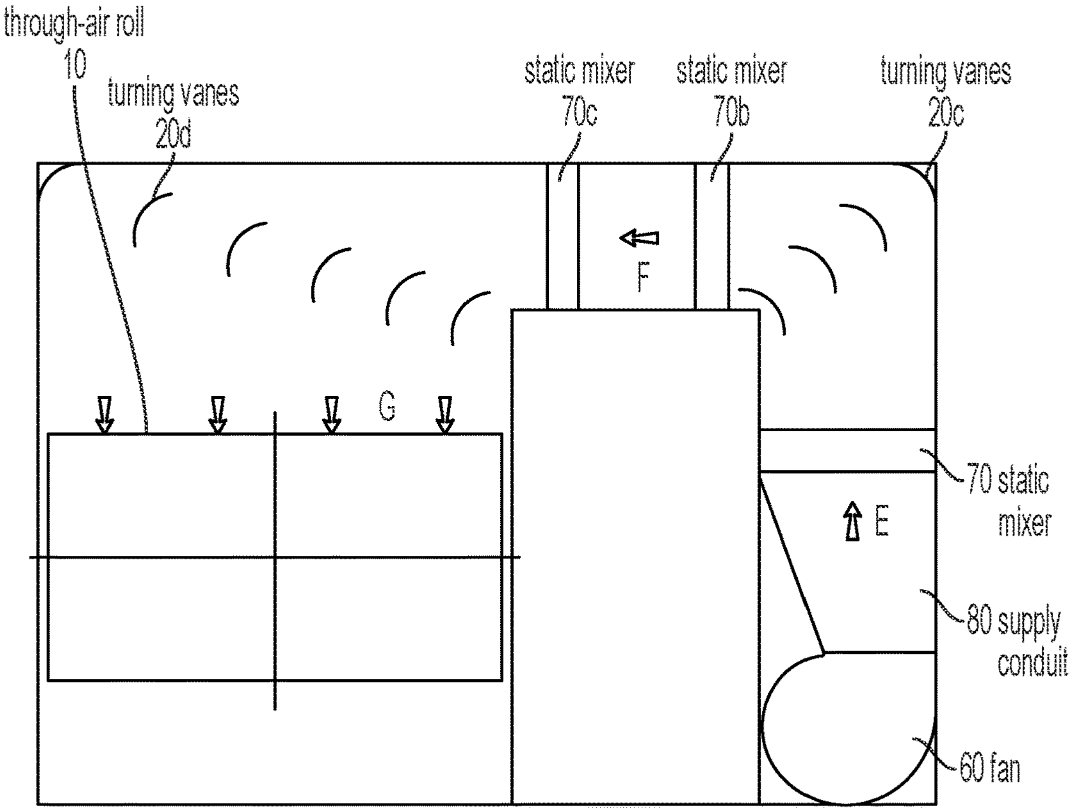
FIG. 5 is a sectional view cut through the supply conduit which illustrates the circuitous air path through the supply conduit.
Figure 6:
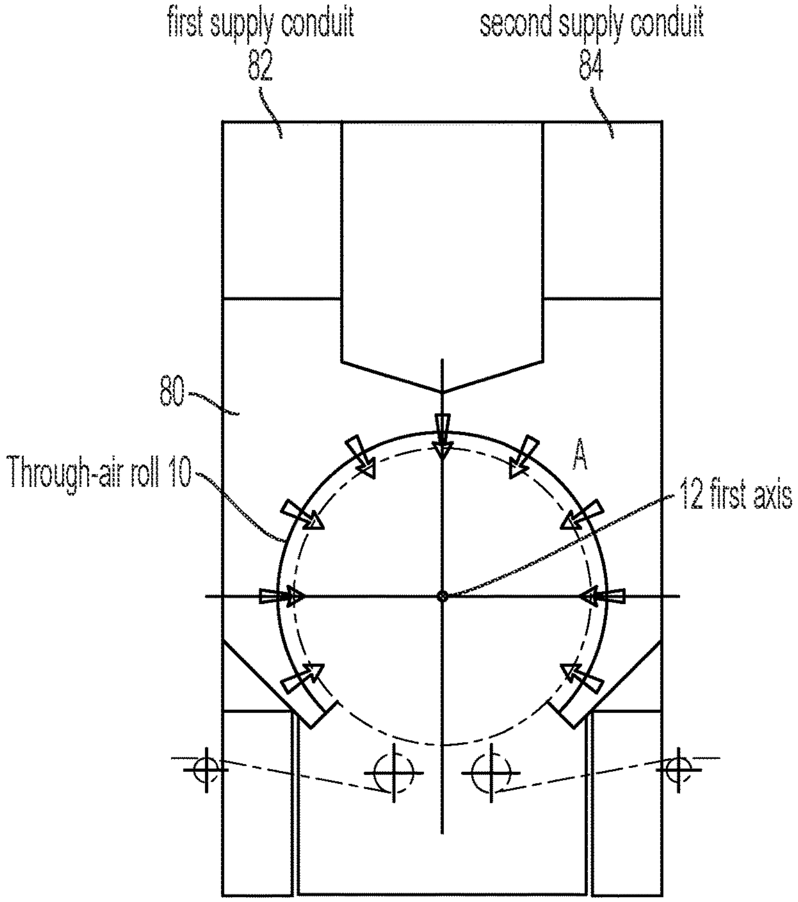
FIG. 6 is a sectional view cut through the front of the through-air apparatus which illustrates the circuitous air path from the supply conduit into the through-air roll.

Turning now to FIGS. 4-6, one embodiment of the high flow circuitous air path inside of the through-air apparatus is shown in more detail. FIG. 4 illustrates the circuitous air path through the exhaust conduit 90 (also known as the suction side of the main fans 60). FIG. 5 illustrates the circuitous air path through the supply conduit 80 (also known as the pressure side of the main fans 60). FIG. 6 illustrates the hood formed by the supply conduit 80 which wraps around the through-air roll 10. As shown in FIGS. 4 and 6, air passes through the inside of the through-air roll 10 as shown by arrows A. The air travels along the first axis 12 of the through-air roll 10, out an exhaust end of the roll 10 and into the exhaust conduit 90 as shown by arrows B and C.

As shown in FIG. 4, the exhaust conduit 90 may include a plurality of turning vanes 20*a*, 20*b* which are positioned to guide the flow of air through the apparatus 100. One of ordinary skill in the art will recognize that turning vanes 20*a*, 20*b* assist the airflow in making a smoother and more gradual change in direction in the exhaust conduit 90, resulting in reduced turbulence. Downstream of the turning vanes 20*a*, 20*b*, the exhaust conduit 90 includes a flow straightener 30, which is used to guide the flow of air 1*w* straightening the air flow in a conduit. One of ordinary skill in the art will recognize that a flow straightener is typically a passage of ducts, positioned along the axis of air stream to minimize the lateral velocity components caused by swirling motion in the air flow. As shown, a heating source 40 may also be provided within the exhaust conduit 90 to heat up the air. The air may travel by the heating source 40 as shown by arrow D. Thereafter, the air passes through a plurality of mixing plates 50 positioned adjacent the heating source 40. It should be recognized that the plurality of mixing plates 50 are configured to mix the air to more evenly distribute the heat to achieve more uniform temperature profile. It is contemplated that the heating source 40 may be an electric heater, a heat exchanger, a direct fixed burner, an indirect fixed burner, or any other thermal energy source.

After passing through the heating source 40 and mixing plates 50, the air flow exits the exhaust conduit 90 and enters the supply conduit 80. As shown in FIG. 3, the air is drawn through one or more fans 60 positioned at the entrance of the first supply conduit 82 and the second supply conduit 84. As shown in the figures, regardless of whether the air passes through the first or the second supply conduit 82, 84, its overall air flow path remains the same as shown in FIG. 5. The air initially passes up through the supply conduit 80 as shown by arrow E and passes through a first static mixer 70*a*. One of ordinary skill in the art will recognize that a static mixer is a device for the continuous mixing of fluid materials, without moving components. As shown in FIG. 5, the supply conduit 80 may include a plurality of turning vanes 20C, followed by one or more additional static mixers 70*b*, 70*c*, as shown by arrow F. Thereafter the air flow goes through an additional set of turning vanes 20*d*, and extends down to the outer diameter of the through-air roll 10 as shown by arrows G. As discussed above, the air flow path then crosses through the through-air roll as shown by arrows A shown in FIGS. 4 and 6. This recirculating air path is repeated.

One of ordinary skill in the art will appreciate that the exact location of the components within the exhaust conduit 90 and the supply conduit 80 may vary according to different embodiments. The various air mixing devices (turning vanes 20A, 20B, 20C, 20D, flow straightener 30, mixing plates 50, and static mixers 70A, 70B, 70C) all assist in elevating the performance of the through-air apparatus 100 to provide flow and temperature uniformity. In one embodiment, mixing is being initiated and allowed throughout the circuitous air path. There may be forced mixing upstream of the fans 60 and also static mixers downstream of the fans 60. There may also be localized directional mixing between the turning vanes 20A, 20B, 20C, 20D. As shown in FIGS. 4 and 5, in one embodiment, the turning vanes 20A, 20B, 20C, 20D are configured to turn the air path at least approximately 90° within the supply conduit 80 and/or exhaust conduit 90. It should be appreciated that in another embodiment, other geometries may be provided.

Figure 7:
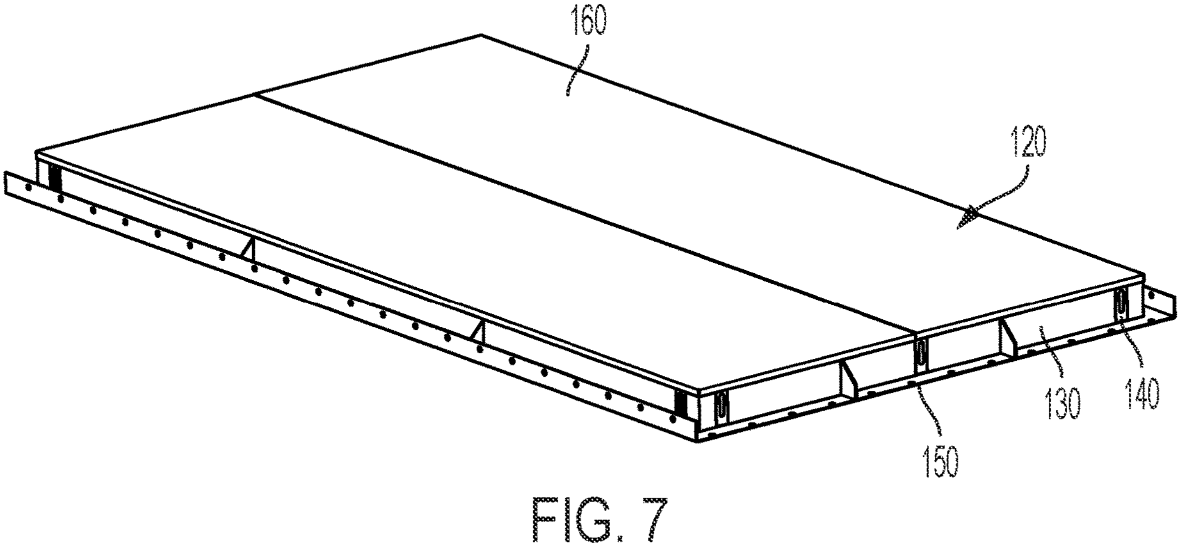
FIG. 7 is a perspective view of a panel according to one embodiment.

Turning now to FIG. 7 which illustrates a panel 120, which may be used to make the walls of the through-air apparatus 100. As shown in FIG. 1, the through-air apparatus 100 may have a panelized construction including a plurality of panels 120. As shown in FIGS. 1 and 7, the panels 120 may have a substantially rectangular or square shape. In one embodiment, the panels 120 are used to form both the external walls shown in FIG. 1, as well as the internal walls shown in FIGS. 2-6 which define the circuitous air path. The panelized construction is substantially different from a conventional through-air apparatus which is generally made of a traditional duct construction. Traditional duct construction may be undesirable because it typically requires large shipment sizes from the point of manufacture, and also because it may include a large amount of void volume during shipping due to the way a conventional duct is constructed. The inventors recognized that instead of individual duct sections mated together to make the air system conduit, these panels 120 may be used to make a pattern of panelized chambers to form the supply conduit 80 and exhaust conduit 90. This may be advantageous for ease of fabrication, shipment and also for ease of installation. In the particular embodiment shown in FIG. 7, the panel 120 includes an inner panel portion 150 and an outer panel portion 160. Sandwiched between the inner and outer panel portions 150, 160 is insulation 130 and a panel standoff 140 for rigidity. As mentioned above, in one embodiment there may be shared common walls between the supply conduit 80 and the exhaust conduit 90. With respect to FIG. 7, the inner panel portion 150 may act as a portion of the supply conduit 80, whereas the outer panel portion 160 may act as a portion of the exhaust conduit 90. It should be recognized that this may result in an overall compact through-air apparatus design.

Figure 8:
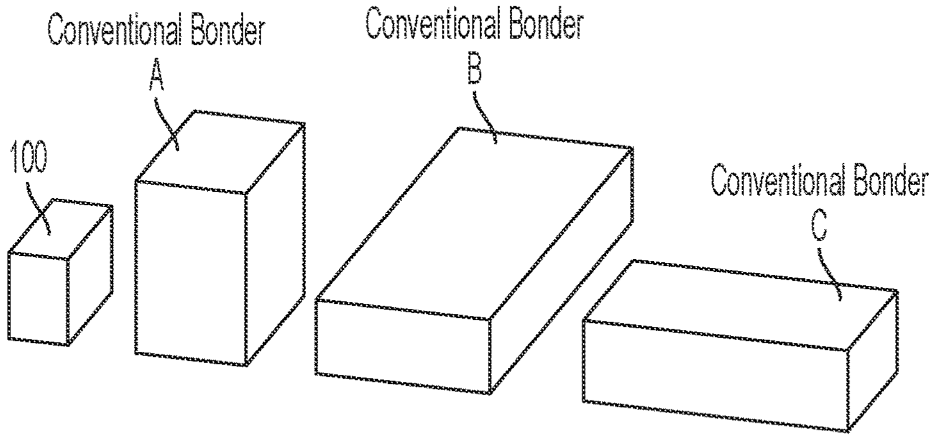
FIG. 8 is a volume comparison of one embodiment compared to three conventional bonder systems.

Turning now to FIGS. 8-11, a comparison of the overall size of the through-air apparatus 100 in comparison to conventional systems will now be more fully described. As mentioned above, one of the advantages of the present disclosure is that the circuitous air path inside of the apparatus 100 enables the through-air apparatus to have a more compact configuration in comparison to a conventional through-air apparatus having a comparable air path length. FIG. 8 is a volume comparison of one embodiment of a through-air apparatus 100 compared to three conventional through-air bonder systems. As shown, the above-described through-air apparatus 100 has a smaller length, smaller width and a smaller height which also results in a much smaller volume. As shown in FIGS. 1 and 8, in one embodiment, the apparatus 100 has a substantially cubic shape.

It should be appreciated that in FIGS. 8-11, the dimensions of the illustrated boxes are rectangular cuboids (i.e. right rectangular prisms) that circumscribe the entire ducting system and its supports. The Cross-Machine Length (Length L shown in FIG. 1) is the distance across the width of the web, or Tending Side to Drive Side of the projection of the system on the ground. This dimension may also be referred to as the Cross Direction Length. The Machine Direction Length ("MD", and also Width W shown in FIG. 1) is the distance of the system's projection onto the ground in the direction of travel of the web being produced. The machine height is the height to the topmost part of the ducting system from the base elevation (Height H shown in FIG. 1).

Figure 9:
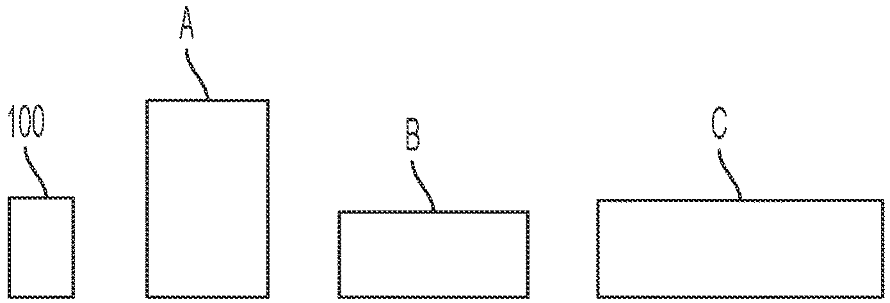
FIG. 9 is a front elevation comparison of one embodiment compared to three conventional bonder systems.

FIG. 9 is a front elevation comparison of one embodiment of a through-air apparatus 100 compared to three conventional through-air bonder systems. As shown, the above-described through-air apparatus 100 has a smaller width and height than the three conventional through-air bonder systems.

Figure 10:
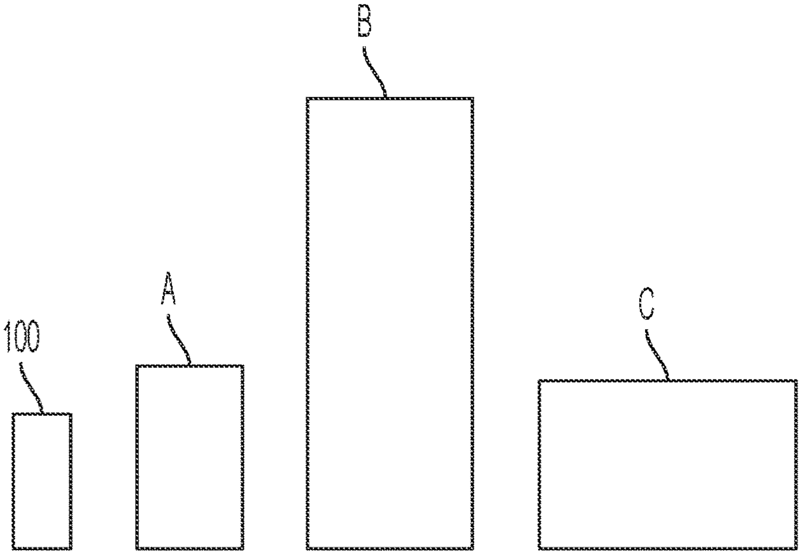
FIG. 10 is a footprint comparison (i.e. top view) of one embodiment compared to three conventional bonder systems.

Finally, FIG. 10 is a footprint comparison (i.e. top view) of one embodiment compared to three conventional through-air bonder systems. As shown, the through-air apparatus 100 has a much more compact footprint due to its smaller length and width.

FIG. 11 is a chart which illustrates various dimensions and data for one embodiment compared to the three conventional bonder systems shown in FIGS. 8-10. The air path length is measured as the total distance a molecule of air must travel as it circulates through the air system along the centerline of the ducting network/conduit and completes one full circuit, thus returning to its point of origin. In one particular embodiment, the air path length of the above-described through-air apparatus 100 is approximately 29.5 meters. In other embodiments, the air path length is at least approximately 20 meters, 25 meters, 30 meters, 35 meters, 40 meters, 45 meters, or 50 meters. It should be recognized that these lengths may be adequate to provide the above described high performance air flow requirements. Notably, the chart in FIG. 11 illustrates that for one embodiment of the through-air apparatus 100, the ratio of the volume of the through-air apparatus to the length of the high flow circuitous air path is less than 20 $m^2$. This is in contrast to Conventional Bonders A, B, and C for which the ratios of the volume of the through-air apparatus to the air path length are all between 30-40 $m^2$. In particular, for Conventional Bonder A, this ratio of the volume of the through-air apparatus to the air path length is 36.9 $m^2$, for Conventional Bonder B, this ratio of the volume of the through-air apparatus to the air path length is 32.7 $m^2$, and finally, for Conventional Bonder C, this ratio of the volume of the through-air apparatus to the air path length is 30.0 $m^2$.

It should be appreciated that in one embodiment, the ratio of the volume of the through-air apparatus to the length of the high flow circuitous air path is less than 30 $m^2$. In another embodiment, the ratio of the volume of the through-air apparatus to the length of the high flow circuitous air path is less than 20 $m^2$, 15 $m^2$, 10 $m^2$, or 5 $m^2$. As shown in FIG. 11, in one embodiment, the ratio of the volume of the through-air apparatus to the length of the high flow circuitous air path is approximately 10.3 $m^2$.

Figure 12:
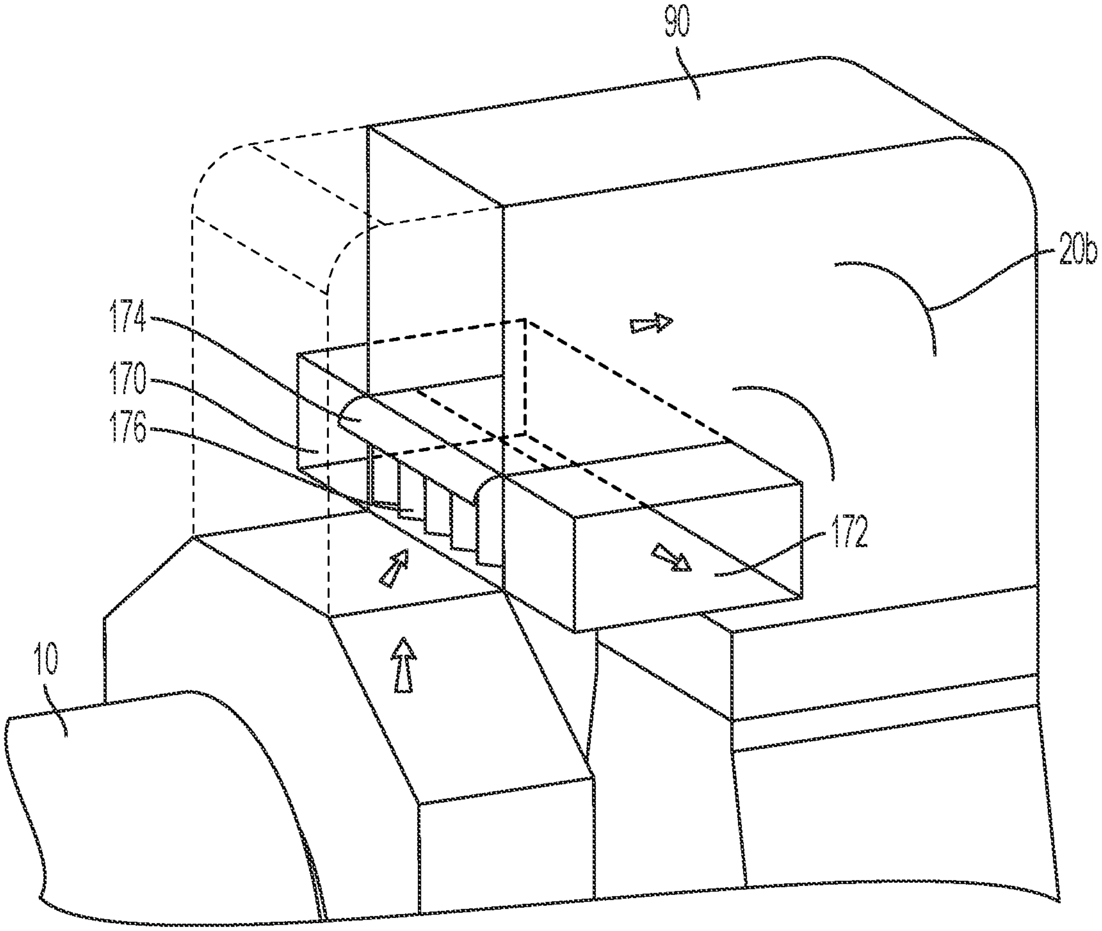
FIG. 12 is a perspective view of a portion of the through-air apparatus which includes an extraction conduit according to one embodiment.

Turning now to FIG. 12, one embodiment of a through-air apparatus which includes an extraction conduit 170 in fluid communication with the high flow circuitous air path will now be described. As shown, the extraction conduit 170 includes an outlet 172 which is configured to extract air inside of the apparatus 100 to atmosphere. Extracting air to atmosphere may ensure a proper balance of the through-air apparatus. The amount of air extracted to atmosphere may be a function of the product permeability, combustion process and/or other variables.

The location of the extraction conduit 170 and how the air is being removed may impact the overall efficiency of the system. As shown, in this particular embodiment, the extraction conduit 170 is positioned proximate the exhaust conduit 90 which may minimize pressure losses within the circuitous air path. However in another embodiment, it is contemplated that the extraction conduit 170 is positioned adjacent another portion of the high flow circuitous air path, such as, but not limited to the supply conduit 80 and the through-air roll 10.

As shown in the embodiment illustrated in FIG. 12, there is a diverter 174 in the extraction conduit 170 which is configured to aid in the control of the amount of air that is extracted to atmosphere through the outlet 172. In one embodiment, the diverter 174 is extendable and retractable into the exhaust conduit 170 to control the amount of air that is extracted to atmosphere. As shown in FIG. 12, the diverter may include a curved portion and may, for example, be scoop-shaped to guide the air through the extraction conduit and to the outlet 172. It is also contemplated that the diverter 174 may be configured to minimize pressure losses within the circuitous air path. As also shown in FIG. 12, there may be a plurality of turning vanes 176 positioned within the extraction conduit 170 to guide the flow of air through the extraction conduit 170, and further reducing pressure losses. Furthermore, as discussed above, a fan and/or a damper may be provided within the high flow circuitous air path to control the rate of air flow through the apparatus 100.

Figure 13:
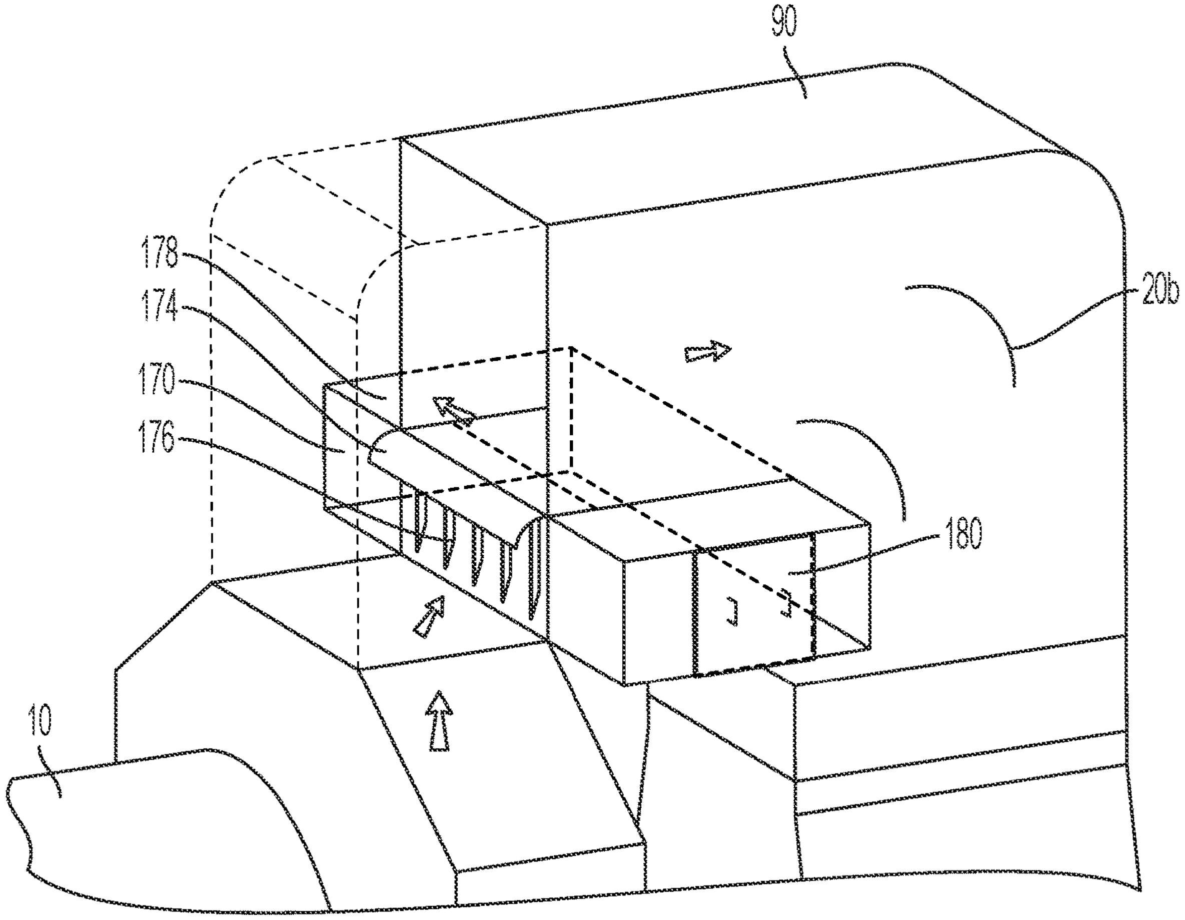
FIG. 13 is a perspective view of a portion of the through-air apparatus which includes an extraction conduit with a first outlet and a second outlet according to one embodiment.

FIG. 13 illustrates another embodiment of a through-air apparatus with an extraction conduit 170. Many of the components shown in FIG. 13 are similar to the above-described components shown in FIG. 12, and are thus given identical reference numbers. In this embodiment, the extraction conduit 170 includes a first outlet 178 which is configured to extract air inside of the apparatus to atmosphere. In this particular embodiment, the first outlet 178 is positioned on a rear side of the extraction conduit 170 in comparison to the outlet 172 shown in FIG. 12 which is positioned on a front side of the extraction conduit 170. As shown, there may be a plurality of turning vanes 176 positioned within the extraction conduit to guide the flow of air through the extraction conduit 170 and out through the first outlet 178. As shown in FIG. 13, the turning vanes 176 may be angled or curved back towards the outlet 178 (this is in contrast to the turning vanes 176 shown in FIG. 12 which are angled forwards towards the outlet 172).

In one embodiment, the extraction conduit 170 shown in FIG. 13 also includes a second outlet 180 configured for inspection inside of the apparatus. As shown in FIG. 13, the second outlet 180 may include an inspection door which may be selectively opened by an operator to access inside of the circuitous air path. The inventors recognized that it may be desirable to have a second outlet 180 spaced apart from the first outlet 178 so that the inside of the apparatus may be inspected. As shown, the extraction conduit 170 may include a bifurcated conduit which includes the first outlet 178 and the second outlet 180, and it is contemplated that the bifurcated conduit may be substantially T-shaped with the adjacent exhaust conduit 90. It should also be appreciated that the first and second outlets 178, 180 may be adapted for extraction of air to atmosphere out either or both of the first or second outlet 178, 180.

Figure 14:
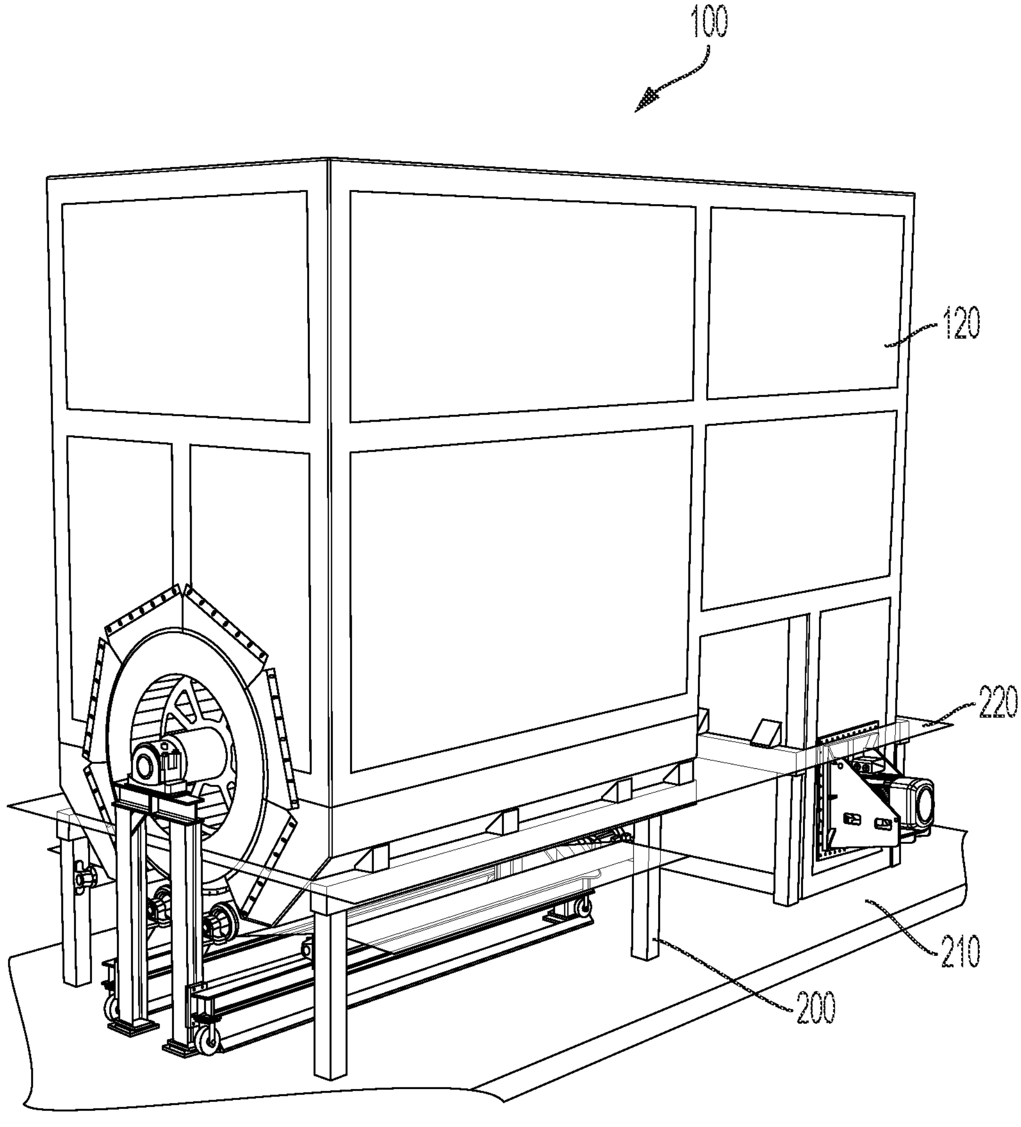
FIG. 14 is a perspective view of a through-air apparatus according to one embodiment where all load bearing surfaces of an external support system are in a common horizontal plane.

FIG. 14 illustrates one embodiment of a through-air apparatus, which is similar to the above described through-air apparatus shown in FIG. 1, and thus similar components are given identical reference numbers. FIG. 14 further illustrates an external support system 200 coupled to the supply conduit 80 and the exhaust conduit 90 where the external support system 200 is configured to secure the supply conduit 80 and the exhaust conduit 90 to a ground surface 210. As discussed above, the supply conduit 80 and the exhaust conduit 90 may have compact design with shared common walls. As discussed above and as shown in FIG. 14, these supply and exhaust conduits 80, 90 may be made of a plurality of panels 120 which form the exterior wall of the through-air apparatus 100. It should be recognized that the inside of the supply conduit 80 and the exhaust conduit 90 are not visible in FIG. 14. In this particular embodiment, the external support system 200 includes a plurality of vertical columns and horizontal beams which comprise a frame system that extends between the supply conduit 80 and the exhaust conduit 90 and the ground surface 210. As mentioned below, in other embodiments other types of external support systems may be used. As shown in the embodiment illustrated in FIG. 14, all load bearing surfaces from the supply conduit 80 and the exhaust conduit 90 to the external support system 200 are in a common horizontal plane 220. As shown, the common horizontal plane 220 is substantially parallel to the ground surface 210.

The inventors recognized that in contrast, in prior through-air apparatus designs, the load bearing surfaces of an air system (i.e. a supply conduit and an exhaust conduit) to an external support system were not all in a common horizontal plane. For example, in prior designs, load bearing surfaces were located in numerous planes. In prior designs, expansion relief joints were typically required at the load bearing surfaces to compensate for thermal growth in the through-air apparatus. The inventors recognized that this was undesirable. The inventors further recognized that one of the advantages of all of the load bearing surfaces of the supply conduit 80 and the exhaust conduit 90 to the external support system 200 being in a common horizontal plane 220 as shown in FIG. 14 is that it eliminates the need for expansion relief joints. The common horizontal plane 220 may also utilize a single central fixed support which minimizes the thermal expansion near the through-air roll 10, which also reduces the required seal gap clearances around the roll 10 and improves process efficiency. It should be recognized that in another embodiment, other types of external support systems may be utilized with the above-mentioned unique common horizontal plane 220, as the disclosure is not so limited.

In one illustrative embodiment shown in FIG. 1, the through-air apparatus 100 also includes a cart 14 which is configured to receive the through-air roll 10. As shown, the cart 14 may include a plurality of wheels 16 and the cart 14 is configured to slide out of the apparatus 100 (along the first axis 12) to load the through-air roll 10 onto the cart 14. Thereafter, the cart 14 and through-air roll 10 are configured to slide into the through-air apparatus. It should be appreciated that the cart 14 configuration may enable the through-air roll 10 to be more easily accessed for maintenance.

It should be appreciated that the specific type of through-air roll 10 may vary as the disclosure is not so limited. In one embodiment, the through-air roll 10 may be a trough style roll obtained from Valmet Inc. (see for example, U.S. Pat. No. 7,040,038 which is incorporated by reference in its entirety). In another embodiment, the through-air roll 10 may be configured differently, and may for instance, be a HONEYCOMB ROLL® obtained from Valmet, Inc.

Furthermore, as shown in FIGS. 2-5, in one illustrative embodiment, the through-air roll 10 has a single exhaust end which is coupled to the exhaust conduit 90. It should also be recognized that the above described concepts may also be incorporated into a through-air apparatus that has a different exhaust configuration, including but not limited to a double exhaust end configuration. Additionally, although an axial exhaust configuration is shown in FIGS. 2-5, it is contemplated that the apparatus may include either axial or radial exhaust configurations.

Furthermore, one of ordinary skill in the art would recognize that in one embodiment, the above-described through-air apparatus may be used on a through-air bonder, and in another embodiment, the above-described through-air apparatus may be used on a through-air dryer, as the disclosure is not so limited.

Although several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A high performance through-air apparatus comprising:

a through-air roll configured for rotational movement about a first axis;

a high flow circuitous air path inside of the apparatus that includes a path extending through a supply conduit, through the through-air roll, and also through an exhaust conduit;

a plurality of turning vanes positioned within the high flow circuitous air path positioned to guide the flow of air through the apparatus;

wherein the through-air apparatus has a length, a width, a height, which together define a volume; and wherein the high flow circuitous air path inside of the apparatus has a length of at least 20 m, wherein the ratio of the volume of the through-air apparatus to the length of the high flow circuitous air path is less than 20 $m^2$.

2. The high performance through-air apparatus of claim 1, further comprising one or more flow straighteners positioned within the high flow circuitous path positioned to guide the flow of air through the apparatus.

3. The high performance through-air apparatus of claim 2, wherein the exhaust conduit further comprises a heating source, wherein the one or more flow straighteners are positioned adjacent the heating source.

4. The high performance through-air apparatus of claim 1, wherein the through-air roll has a single exhaust end which is coupled to the exhaust conduit.

5. The high performance through-air apparatus of claim 1 having a panelized construction comprising a plurality of panels assembled together to form the through-air apparatus.

6. The high performance through-air apparatus of claim 1, wherein the first axis is substantially parallel to the length of the through-air apparatus.

7. The high performance through-air apparatus of claim 1, wherein the supply conduit of the high flow circuitous air path inside of the apparatus is bifurcated to include a first supply conduit positioned on a right side of the through-air apparatus, and a second supply conduit positioned on a left side of the through-air apparatus.

8. The high performance through-air apparatus of claim 7, wherein the exhaust conduit is interposed between the first supply conduit and the second supply conduit.

9. The high performance through-air apparatus of claim 7, wherein the second supply conduit is a mirror image of the first supply conduit.

10. The high performance through-air apparatus of claim 7, wherein the first supply conduit positioned on the right side of the through-air apparatus includes a first set of turning vanes configures to turn the air path, and a second set of turning vanes configured to turn the air path.

11. The high performance through-air apparatus of claim 10, wherein the second supply conduit positioned on the left side of the through-air apparatus includes a third set of turning vanes configures to turn the air path, and a fourth set of turning vanes configured to turn the air path.

12. The high performance through-air apparatus of claim 10, wherein the first and second set of turning vanes are each configured to turn the air path at least approximately 90° within the first supply conduit.

13. The high performance through-air apparatus of claim 1, further comprising one or more static mixers within the high flow circuitous path positioned to guide the flow of air through the apparatus.

14. The high performance through-air apparatus of claim 1, wherein the exhaust conduit further comprises a heating source, wherein the exhaust conduit further comprises a plurality of mixing plates adjacent the heating source.

15. The high-performance through-air apparatus of claim 1, wherein the ratio of the volume of the through-air apparatus to the length of the high flow circuitous air path is less than 10 $m^2$.

16. The high performance through-air apparatus of claim 1, wherein the apparatus has a substantially cubic shape.

17. The high performance through-air apparatus of claim 1, further comprising an extraction conduit in fluid communication with the high flow circuitous air path, wherein the extraction conduit is configured to extract air inside of the apparatus to atmosphere.

18. The high performance through-air apparatus of claim 17, wherein the extraction conduit is positioned proximate the exhaust conduit.

19. The high performance through-air apparatus of claim 17, further comprising at least one of a fan and a damper within the high flow circuitous air path configured to control the rate of air flow through the apparatus.

20. The high performance through-air apparatus of claim 1, further comprising at least a first panel, the first panel having a first side which forms a portion of the supply conduit, and a second opposite side which forms a portion of the exhaust conduit.

21. The high performance through-air apparatus of claim 1, wherein the supply conduit extends across a majority of the length and the height of the through-air apparatus.

22. A high performance through-air apparatus comprising:
- a through-air roll configured for rotational movement about a first axis;
- a high flow circuitous air path inside of the apparatus that includes a path extending through a supply conduit, through the through-air roll, and also through an exhaust conduit;
- a plurality of turning vanes positioned within the high flow circuitous air path positioned to guide the flow of air through the apparatus;
- wherein the through-air apparatus has a length, a width, a height, which together define a volume;
- wherein the high flow circuitous air path inside of the apparatus has a length, wherein the ratio of the volume of the through-air apparatus to the length of the high flow circuitous air path is less than 20 $m^2$; and
- a cart configured to receive the through-air roll, wherein the cart has a plurality of wheels, wherein the cart and through-air roll are configured to slide into the through-air apparatus.

23. A high performance through-air apparatus comprising:
- a through-air roll configured for rotational movement about a first axis;
- a high flow circuitous air path inside of the apparatus that includes a path extending through a supply conduit, through the through-air roll, and also through an exhaust conduit;
- a plurality of turning vanes positioned within the high flow circuitous air path positioned to guide the flow of air through the apparatus;
- wherein the through-air apparatus has a length, a width, a height, which together define a volume;
- wherein the high flow circuitous air path inside of the apparatus has a length, wherein the ratio of the volume of the through-air apparatus to the length of the high flow circuitous air path is less than 20 $m^2$; and
- an extraction conduit in fluid communication with the high flow circuitous air path, wherein the extraction conduit is configured to extract air inside of the apparatus to atmosphere;
- wherein the extraction conduit includes a bifurcated conduit which includes a first outlet configured to extract air inside of the apparatus to atmosphere, and a second outlet configured for inspection of inside of the apparatus.

24. The high performance through-air apparatus of claim 23, wherein the bifurcated conduit is substantially T-shaped.

25. A high performance through-air apparatus comprising:
- a through-air roll configured for rotational movement about a first axis;
- a high flow circuitous air path inside of the apparatus that includes a path extending through a supply conduit, through the through-air roll, and also through an exhaust conduit;
- a plurality of turning vanes positioned within the high flow circuitous air path positioned to guide the flow of air through the apparatus;
- wherein the through-air apparatus has a length, a width, a height, which together define a volume;
- wherein the high flow circuitous air path inside of the apparatus has a length, wherein the ratio of the volume of the through-air apparatus to the length of the high flow circuitous air path is less than 20 $m^2$;
- an extraction conduit in fluid communication with the high flow circuitous air path, wherein the extraction conduit is configured to extract air inside of the apparatus to atmosphere; and
- a diverter in the extraction conduit, wherein the diverter is extendable and retractable into the exhaust conduit to aid in the control the amount of air that is extracted to atmosphere.

26. A high performance through-air apparatus comprising:
- a through-air roll configured for rotational movement about a first axis;

a high flow circuitous air path inside of the apparatus that includes a path extending through a supply conduit, through the through-air roll, and also through an exhaust conduit;

a plurality of turning vanes positioned within the high flow circuitous air path positioned to guide the flow of air through the apparatus;

wherein the through-air apparatus has a length, a width, a height, which together define a volume;

wherein the high flow circuitous air path inside of the apparatus has a length, wherein the ratio of the volume of the through-air apparatus to the length of the high flow circuitous air path is less than 20 $m^2$;

an extraction conduit in fluid communication with the high flow circuitous air path, wherein the extraction conduit is configured to extract air inside of the apparatus to atmosphere; and a plurality of turning vanes positioned within the extraction conduit to guide the flow of air through the extraction conduit.

27. A high performance through-air apparatus comprising:

a through-air roll configured for rotational movement about a first axis;

a high flow circuitous air path inside of the apparatus that includes a path extending through a supply conduit, through the through-air roll, and also through an exhaust conduit;

a plurality of turning vanes positioned within the high flow circuitous air path positioned to guide the flow of air through the apparatus;

wherein the through-air apparatus has a length, a width, a height, which together define a volume;

wherein the high flow circuitous air path inside of the apparatus has a length, wherein the ratio of the volume of the through-air apparatus to the length of the high flow circuitous air path is less than 20 $m^2$; and an external support system coupled to the supply conduit and the exhaust conduit, wherein the external support system is configured to secure the supply conduit and the exhaust conduit to a ground surface, and wherein all load bearing surfaces from the supply conduit and the exhaust conduit to the external support system are in a common horizontal plane.

28. The high performance through-air apparatus of claim 27, wherein the common horizontal plane of the external support system enables the use of a single fixed support.

* * * * *